United States Patent [19]

Boone et al.

[11] 3,843,077
[45] Oct. 22, 1974

[54] AUTOMATIC APPROACH LANDING AND GO-AROUND ROLL AXIS CONTROL SYSTEM FOR AIRCRAFT

[75] Inventors: Jimmie H. Boone, Bellevue; Gary A. Chenkovich, Seattle, both of Wash.; Brian F. Corcoran, Bettendorf, Iowa; Arley C. Marley, III, Renton; Robert D. Simpson, Bellevue, both of Wash.

[73] Assignee: The Boeing Company, Seattle, Wash.

[22] Filed: Feb. 7, 1972

[21] Appl. No.: 224,007

[52] U.S. Cl...... 244/77 A, 235/150.22, 235/150.26, 244/77 B, 343/107
[51] Int. Cl. ............................................ B64c 13/18
[58] Field of Search..... 235/150.22, 150.26, 150.27; 244/77 A, 77 B, 77 C, 77 D, 77 S, 77 E, 77 G, 77 M; 318/583, 585; 343/107, 5 LS

[56] References Cited
UNITED STATES PATENTS

| 2,809,340 | 10/1957 | Bernhart | 244/77 D X |
|---|---|---|---|
| 2,961,202 | 11/1960 | Summerlin | 244/77 E |
| 2,996,268 | 8/1961 | Brown et al. | 244/77 G |
| 3,057,584 | 10/1962 | Bretoi | 244/77 S |
| 3,103,329 | 9/1963 | Unger et al. | 244/77 B |
| 3,358,948 | 12/1967 | Sims | 244/77 A |
| 3,361,392 | 1/1968 | Doniger et al. | 244/77 A |
| 3,445,846 | 5/1969 | Diani | 343/107 |
| 3,578,269 | 5/1971 | Kramer et al. | 244/77 A |
| 3,635,428 | 1/1972 | Nelson et al. | 343/107 X |
| 3,652,835 | 3/1972 | Devlin et al. | 244/77 A X |

*Primary Examiner*—Trygve M. Blix
*Assistant Examiner*—Stephen G. Kunin
*Attorney, Agent, or Firm*—Conrad O. Gardner; Glenn Orlob

[57] ABSTRACT

The present autopilot approach coupler is a ground track command system which provides switchless signal processing during localizer, tracking and flare, and in addition, provides automatic go-around control from any altitude during the approach.

13 Claims, 4 Drawing Figures

AUTOMATIC APPROACH LANDING AND GO-AROUND ROLL AXIS CONTROL SYSTEM FOR AIRCRAFT

This invention relates to flight control systems, and more particularly to a roll axis approach, landing, and go-around control system for controlling by means of the aircraft control surfaces, the position of the aircraft in order to track the ground based localizer deviation signal.

Heretofore systems utilized to derive the corresponding ground track rate signals have utilized a stabilized platform or INS system to derive the same type of data.

Accordingly, it is an object of the present invention to provide means including a washout circuit (integral loop circuit path) in combination with roll attitude ($\phi$) and body mounted lateral acceleration ($\delta y$) to derive acceptable ground track rate signals.

In accordance with a preferred embodiment of the invention, a minor loop is utilized to provide aircraft stability. A further feature of the present roll axis control system is the computation of ground heading error from acceleration and bank angle in order to provide damping on tracking the localizer beam.

A further feature of the present invention is the utilization of path integrator circuit means to provide pre-engage synchronization and improved localizer tracking subsequent to engagement. In the present system, the aircraft is controlled by a separate input comprising cruise commands prior to engagement. Engagement occurs when several predetermined logic signals are present and the aircraft is within localizer deviation limits. At go-around initiation, the localizer deviation signal is removed and the aircraft follows the existing ground heading.

The foregoing and other objects and features of the system according to the present invention will become more apparent from a consideration of the following description and in reference to the drawings wherein corresponding parts have been indicated by corresponding numerals and wherein.

Figure 1:
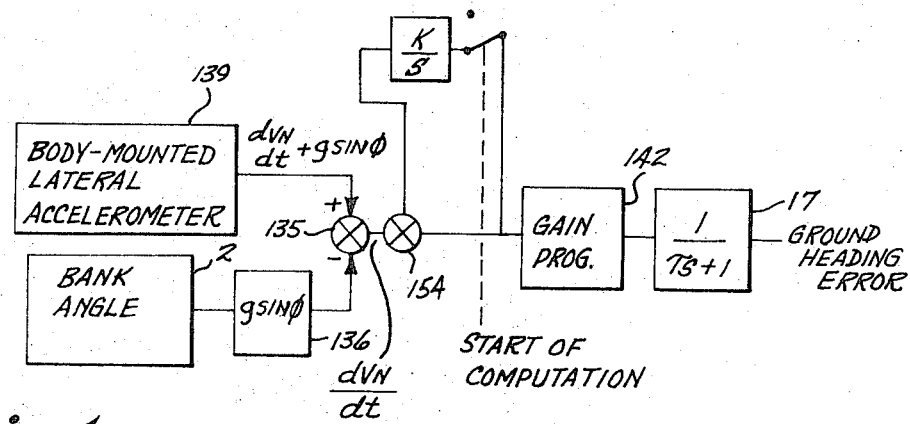
FIG. 1 is a block diagram illustrative of the manner of derivation of ground heading error signals in accordance with an embodiment of the present invention by means of integration (pseudo or exact) of roll compensated lateral acceleration.

Turning briefly now to FIG. 1, it will be noted that signal processing of signals representative of lateral acceleration are roll compensated by bank angle information signals to derive signals representative of ground heading error information. This ground heading error information developed in this manner is further utilized in the present roll axis control system shown in FIG. 2 wherein block 154 is representative of the FIG. 1 manner of developing these ground heading error signals.

Figure 2:
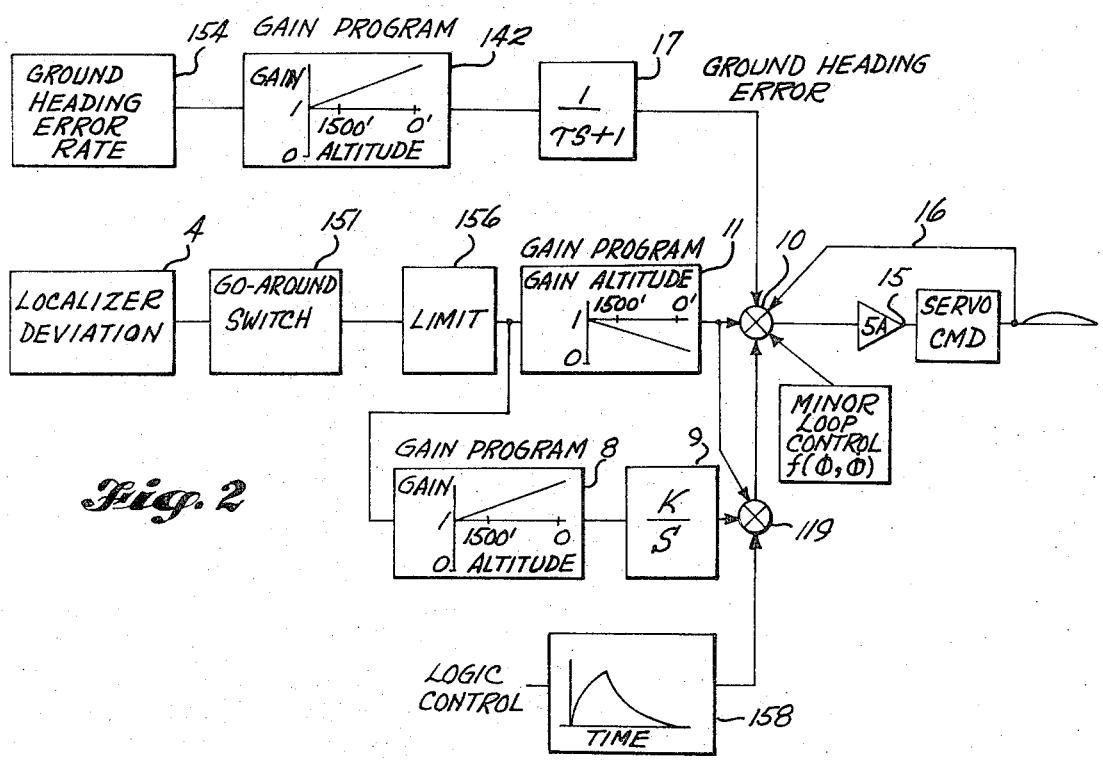
FIG. 2 is a simplified block diagram illustrative of signal processing functions representative of several novel features of the present roll axis control system.

It should be noted that an important feature of the present roll axis control system of FIG. 2 is the utilization of ground heading error 154 for damping in a lateral axis control system. A further important feature of the present system can be seen in the simplified block diagram of FIG. 2, viz., the use of ground heading hold during go-around at switching means 151. In this connection it should be further noted that removal of beam error signal leaves the present system on ground heading hold.

A further significant feature of the present roll axis control system can be observed from the simplified diagram of FIG. 2, namely the utilization of increased gain programming (by gain programmer circuit means 142) with altitude of the ground heading error as shown in the gain characteristic to give a fixed time constant control law. Another important feature of the present roll axis control system seen from FIG. 2 is the utilization of increased gain programming (at gain program circuit means 8) of integral beam error (localizer) to provide improved beam tracking at low altitude. A further significant feature of the present roll axis control system is the provision for lateral dynamic test to ensure operation of critical sensors through monitoring, the logic control signals at 158 coupled to adder circuit means 119 causing an output of all critical sensors.

Figure 4:
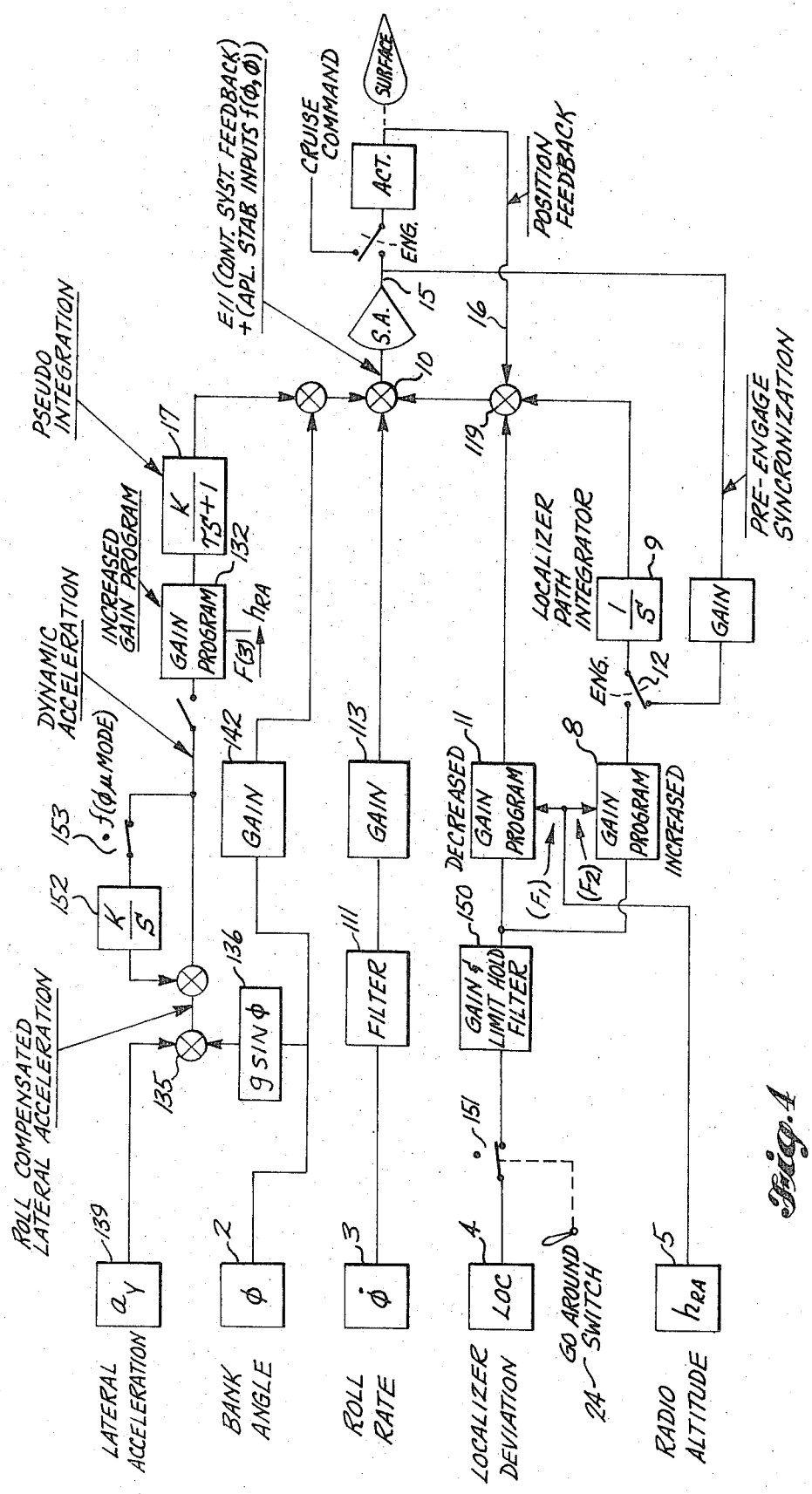

A further important feature of the present roll axis control system of FIG. 4 also shown in the simplified block diagram of FIG. 2 is the provision of down programming of bank angle command limit with altitude by means of limiter circuit means 156 upstream of gain programmer circuit means 11. A further feature of the present roll axis control system is the nullification of the lateral sensor 139 and bank angle sensor 2 (see FIG. 1) null errors while ignoring the dynamic signals from the lateral sensor 139 and bank angle sensor 2.

Figure 3:
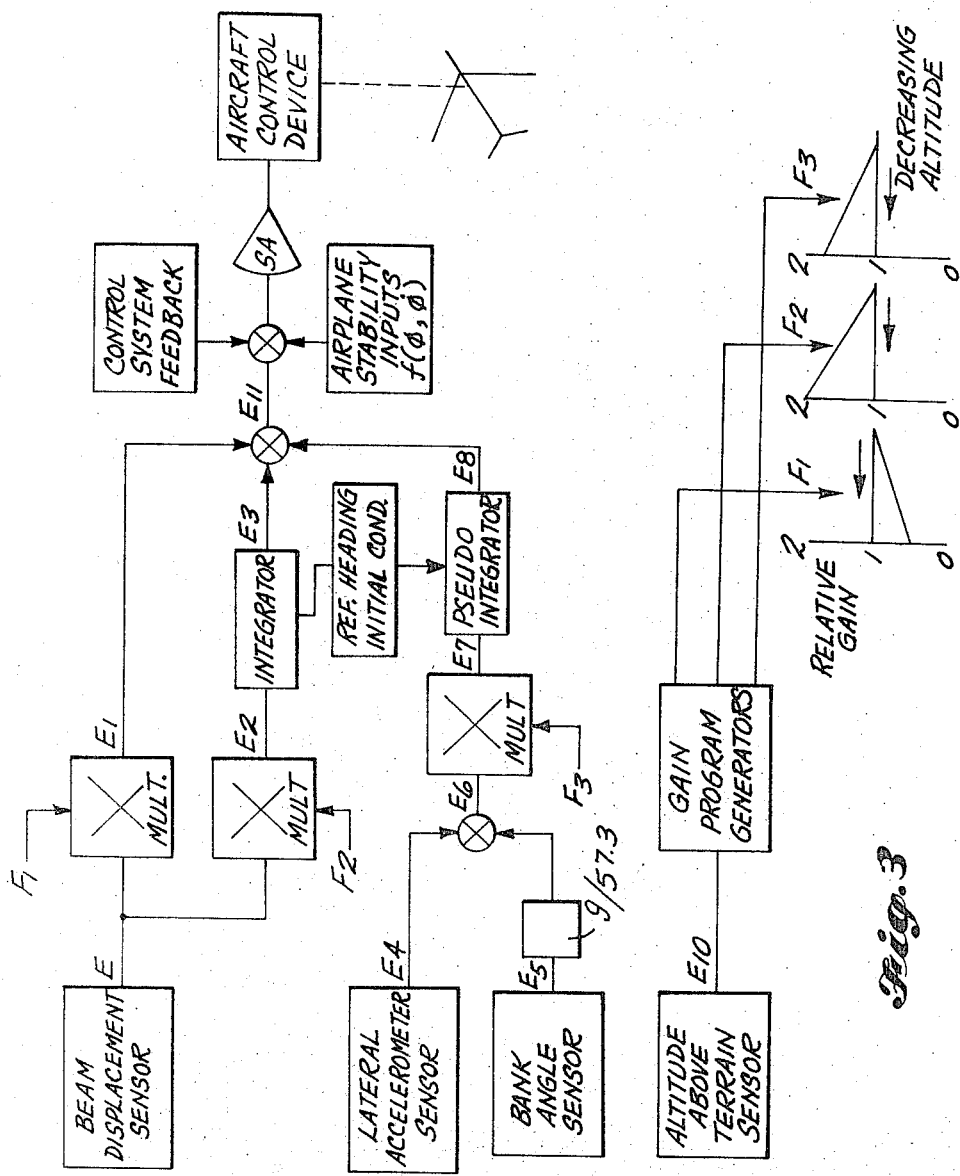
FIG. 3 is a block diagram showing representative circuitry utilized in practicing several important features of the present invention; and, FIG. 4 is a schematic block diagram of one embodiment of the present automatic approach landing and go-around roll axis control system or aircraft.

FIG. 3 is helpful in showing the individual gain programmer circuit requirements for the gain programmers shown in FIG. 2 and the manner of developing the input signals F1, F2, and F3 derived from altitude above terrain sensing means which are coupled to the multiplier circuit means making up the individual gain programmer circuits shown in FIG. 2.

The present roll axis control system shown in detail in FIG. 4 may be compared with the prior art as exemplified in U.S. Pat. No. 3,361,391 to Medlinski for a further understanding of the significant and distinguishing features of the present system.

In the present system, gain programming is a function of altitude (range or distance from the runway may be utilized instead of altitude) rather than beam rate as Medlinski resulting in better system stability and a more realistic system when exposed to the "real world" beams.

Heading displacement input in the present system is ground track rather than airplane magnetic heading as Medlinski. The result is a reference which is with reference to the ground rather than the air mass. This is an important consideration during wind shears where the aircraft magnetic heading is changing but the desired ground track does not change. The former requires a beam displacement error into the path integrator to correct for the signal change while the latter allows the aircraft heading to change without demanding error.

Accordingly, important and significant features of the present roll axis control system include:

a. Derivation of ground track by integration of the lateral accelerometer signal.
b. A method of eliminating the offset of the accelerometer without storing up dynamic response.
c. Planned lateral dynamic test provisions to force a dynamic response of all sensors used by commanding the aircraft through a controlled maneuver.

The following control equations define the commanded aileron control in the present roll axis control system: $K_1 f_1(h)n + K_2 f_2(h)n/S + K_3 f_3(h)(ay + g\phi)1/\tau S + 1 + G_1(S)\phi + G_2(S)\dot{\phi} = \delta a$
where
$K_1$ = direct beam gain
$K_2$ = integral beam gain
$K_3$ = accelerometer gain
$f_1(h), f_2(h), f_3(h)$ = gain programming with altitude $n$ = beam displacement signal
$ay$ = lateral accelerometer signal
$\phi$ = bank angle
$\dot{\phi}$ = bank angle rate (roll rate)
$G_1(S), G_2(S)$ = filtering and gain
$\tau$ = pseudo integrator time constant
$g$ = 32.2 $fps^2$
$\delta a$ = commanded aileron control Turning now to FIG. 4, there is shown the complete roll axis control system which provides the functions, already separately discussed. In the following discussion reference numerals corresponding to those used earlier will be used to identify corresponding elements of the system.

In the system of FIG. 4, between the system output terminal 15 and the summing junction 10 there is coupled a negative feedback loop. This negative feedback loop comprises the localizer integrator 9 connected through switching means 12 comprising a relay switch in the position shown for providing a synchronizing path. This synchronizing path provides two functions when operating in the synchronizing mode. The first function is for reducing signals present at the system output terminal 15 to reference potential (zero) by driving localizer integrator circuit 9 so that the output signal voltage of integrator circuit 9 is substantially equal and opposite to the sum of the remaining signal voltages at summing junction 10. In this manner, the roll axis control system output signal at computer system output terminal 15 is maintained at reference potential (zero voltage level) to assure that no undesirable aircraft maneuver is experienced at the time of engagement of the automatic approach and landing computer of the present roll axis control system. The second function of the synchronizing path is for providing localizer acquisition initial conditions so that when the present automatic approach and landing roll axis control system is engaged by closing switching means 12 to the dotted line position, the present system will maneuver the aircraft onto the localizer zero plane. This function is accomplished in a unique and novel manner without having to switch in a separate signal generating means and by utilizing the same control laws previously derived which also provide the localizer zero plane tracking. Since the localizer integrator circuit 9 has stored at its output, a signal voltage which is equal and opposite to the sum of all other signal voltages appearing at the input of summing junction 10, and, for a localizer acquisition from a point to either side of the localizer zero plane, this stored output contains a signal which is equal and opposite to the fly left or right command from the localizer error detector 4 through the variable localizer gain programmer circuit 11. Circuit 11 comprises means well-known in the art for multiplying two variables together, e.g., pulse width modulated shunt switching means. At a fixed logic level during the approach (e.g., glide slope captured, less than 1500 ft.) switching means 12 is caused to transfer and thus removing the output signal at terminal 15 from the input summing junction of the localizer integrator. The synchronizing path is removed by this action and the localizer integrator signal at this instant in time is fixed and can no longer change to drive the output signal at terminal 15 to zero for any change in the remaining input signals to summing junction 10. As the aircraft continues to fly toward the localizer zero plane, the fly left or right command from localizer error detector 4 is reduced in magnitude thus creating an error signal at system output terminal 15 in a right or left command direction which comprises the stored fly left or right signal from localizer integrator 9 and the decreased fly right or left signal from localizer error detector 4. The fly left or right command error signal at the output terminal 15 causes the aileron control system to cause displacement in a direction causing the aircraft to maneuver onto the localizer zero plane. This displacement of aileron surfaces in the control system is coupled by surface feedback measuring means 16 to null the system output command signal voltage at system output terminal 15. The aircraft rate of ground track change signal voltage provided by roll attitude detector 2 and the aircraft rate of acceleration signal voltage provided by detector means 139 (comprising an accelerometer having sensitive axis mounted normal to the desired flight path) shown in FIG. 10 sense that the aircraft is changing ground track and these two signal voltages are summed and coupled through lag filter means 17 (comprising a low pass lag filter, e.g., a resistor in parallel with a capacitor in feedback circuit of an operational amplifier) to produce a signal which is referenced to the aircraft flight path. This uniquely derived signal is obtained by combining at adder 135 (comprising, e.g., a summing junction): accelerometer 139 which is positioned at the center of gravity of the aircraft (as shown in FIG. 11) which transmits this signal component through gain programmer 132, and roll attitude signal source 2. As the aircraft approaches the landing runway, the output signal from lag filter 17 is representative of a ground track change in the system or a deviation from the aircraft flight path available through the circuit path coupled to junction 10 to null or cancel the signal voltage representative of commanded deviation from the aircraft flight path 119.

The results of the above described method of acquiring the localizer zero plane is a fly left or right ground track command signal voltage proportional to the error between the stored localizer error signal voltage at the output of localizer integrator circuit 9 and the actual localizer error signal voltage generated by localizer error detector 4. In this manner this unique feature of the present roll axis control system provides a means for acquiring the localizer zero plane which is substantially independent of external factors such as aircraft speed, and localizer error signal gradients. The above feature is accomplished by utilizing only one signal generating means for both localizer acquisition and tracking functions.

The above described roll axis control system provides a flight path command signal at the system output terminal 15 which positions the aircraft on a flight path to exponentially acquire the localizer zero plane, and it will be further noted that the closing of the switch 12 (to the position shown by the dotted line) also couples in series circuit path localizer gain programmer circuit 3 between localizer error detector circuit 4 and localizer path integrator 9 thereby providing a means for varying the stored localizer error signal present at the output of localizer integrator 9 during the localizer acquisition maneuver and subsequent localizer zero plane tracking to thereby eliminate errors developed in the flight path command signal present at system output terminal 15 and as a consequence cause the aircraft to acquire and track the zero plane of the localizer error signal. The localizer integrator output signal voltage from integrator circuit 9 at this time is proportional to but of opposite polarity to the ground track signal voltage of the aircraft at low pass lag filter 17 which relationship is required to maintain the localizer error signal voltage at localizer error detector 4 equal to zero.

The damping terms for the roll axis control system of FIG. 4 are derived in a novel and unique manner by mounting of the accelerometer 1 normal to the flight path and at the aircraft center of rotation such that the output of accelerometer circuit 1 comprises: a signal voltage component $dV_n/dt$ proportional to the time rate of change of the aircraft velocity normal to the desired flight path; and, voltage component $g \sin \phi$ proportional to the aircraft roll attitude, and which is also insensitive to the time rate of change of the aircraft's velocity tangential to the flight path $dV_p/dt$. An additional signal 136 derived in a manner well-known in the state of the art is generated from roll angle sensor 2 to compensate the accelerometer sensor 139 and eliminate the effects of the $g \sin \phi$ term inherent in a body mounted accelerometer. The output signal voltage from accelerometer circuit 1 is processed through lag filter 17 which provides an output signal voltage which is proportional to time rate of change of aircraft ground track $d\psi/dt$. A second circuit path is provided in series circuit between roll attitude and system output terminal 15 by means of gain programmer circuit 142 to provide a further output signal voltage which is proportional to the output of roll attitude for minor loop stability. In the event that the accelerometer fails, i.e., no output, the roll attitude compensation signal ($g \sin \phi$) 136 passed through lag circuit 17 becomes a signal proportional to the change in aircraft heading to provide system damping terms. In this manner, the critical damping term necessary for stability of the aircraft when flying an approach and landing are derived from the single source (roll attitude) thereby increasing the reliability of the system by reducing the number of critical component sensors necessary in the achievement of safe stability margins.

The roll rate voltage signal source utilized is roll rate detector 3 which is coupled in series circuit through filter 111 and summing resistor 113 to summing junction 10 to provide an additional damping term in the system output signal voltage at output terminal 15 by summation through summing junction 10. This damping term is not critical in affecting aircraft or flight path stability.

A further feature of the presently described roll axis control system of FIG. 4 provides a unique means of maintaining system stability while increasing command sensitivity to lateral displacement errors with decreasing distance to the localizer transmitter, and simultaneously decreasing the maximum roll attitude command without discrete switching in preparation for the flare maneuver.

The localizer deviation signal 4 is passed through an amplifier 150 with a gain adjusted so that the acceptance level of the amplifier provides an acceptable maximum roll attitude command (e.g., 10° for Boeing 747 type aircraft). Gain programmer 11 downstream of the command limiter server two functions. As the airplane approaches the touchdown point, gain programmer 11 decreases the gain of the localizer deviation signal 4 at one half the rate of the signal gradient increase. Thus, the voltage per foot of flight path position error appearing at the output of gain programmer 11 is doubled in magnitude at touchdown. The maximum voltage which can appear at the command limiter output 150, representing a maximum roll attitude commanded, is attenuated to one half its magnitude at touchdown to prevent large bank angle commands during the time the aircraft is close to the ground.

The output of summing junction 135 is uniquely passed through gain programmer circuit means 132 which increases gain as a function of approaching the touchdown point. Thus, as the command sensitivity to lateral position error is increased, the gain of the ground track damping term is proportionately increased to maintain a constant degree of system stability.

To increase system tracking accuracy, a constant ratio of localizer integral gain to ground track damping term gain is used. The localizer deviation signal is passed through gain programmer circuit means 8 with a gain-increase schedule essentially equal to the ground track gain programmer schedule. The result is an increasing ability to minimize flight path errors while maintaining a high degree of stability at lower altitudes.

A further important feature of the presently described roll axis control system of FIG. 4 provides a unique means of deriving inertial ground track rate from the combined signals of a body mounted accelerometer 139 and roll attitude sensor 2. The summated signals of these two sensors at adder circuit means 135 are representative of ground heading rate plus steady-state errors due to sensor misalignment, null voltages, and airplane lateral trim attitude. The summated signals 135, as also shown in FIG. 1, are summed with the output signal of voltage integrator 152 at summing junction 154. The input to the integrator is the summed output of summing junction 154 passed through the logic-actuated switching means 153. The actuating logic is derived from the output of a roll attitude threshold detector and control mode logic combined in a way to close switch 153 whenever the airplane roll attitude is less than a prescribed value, and the localizer capture or tracking control modes are not operating. The output of integrator 152 serves to reduce the voltage output of 154 to zero whenever the airplane is flying at trim attitude thereby cancelling the error voltages which are not proportional to ground track rates. As the airplane maneuvers to change ground track, the switch 153 opens and the error cancelling voltage stored in integrator 152 remains unchanged. The combined output of summing junction 154 is passed through a previously described gain programmer and lag filter 17. The time constant of lag filter 17 is set sufficiently large so that pseudo-integration of the lag filter 17 input signal occurs. The output signal is, therefore, the integral of ground track rate, e.g., ground track change.

A further important feature of the presently described roll axis control system is that upon being placed in control of the roll axis, no further switch actions occur prior to touchdown or disengagement of the system. A programmed disturbance of the airplane laterally away from its intended flight path serves to test the integrity of the sensors, interface paths between sensors and computer, the computation mean, and the servo actuators positioning the aileron control surfaces. The programmed disturbance is generated by voltage shaping circuit means 158 in FIG. 2. The logic control signals actuating the voltage shaping circuit means is based on the control system switching into roll axis control. The voltage wave shape generated by circuit means 158 is designed to disturb the airplane away from its flight path, then to reduce amplitude rapidly so that the commands to reacquire the localizer zero plane must be generated by the combined inputs of all sensors and their respective signal shaping paths. Failure of any critical portion of the control system will result in abnormal reacquisition performance.

Automatic go-around control is initiated by the pilot actuating a go-around switch 24 located in the cockpit. Actuation of switch 24 opens the localizer deviation signal path by switch 151. The resulting control commands are automatically changed from a localizer-referenced flight path command to a ground track-referenced command. The ailerons are thereafter positioned to maneuver the airplane along its inertial ground track existing at the time switch 24 was actuated. This unique and novel means of providing a ground track reference during the go-around maneuver is accomplished without the introduction of any second signal source means and by utilizing already known to be operating signal components.

What is claimed is:

1. In combination in an aircraft having a roll axis control system and having an output terminal: first means coupled to said output terminal for storing a constant signal representative of commanded ground track error;
   second means coupled to said output terminal for generating a further signal representative of change in ground track thereby providing a signal to null or cancel said commanded ground track error signal or providing ground track referenced control during go-around,; and wherein said first means comprises: sensor means providing a signal representative of aircraft ground track error; integrator circuit means connected in feedback circuit around said output terminal; second switching means connected in series circuit between said sensor means and said control system output terminal; third switching means connected in series circuit between said control system output terminal and said integrator circuit means and switching simultaneously with said second switching means.

2. In combination in an aircraft roll axis control system comprising:
   first means including roll attitude signal generating means, and second means for generating signals representative of lateral acceleration of said aircraft;
   third means comprising an adder circuit for combining said signal representative of lateral acceleration of said aircraft, including that portion of said roll attitude signal and said lateral acceleration signal representative of steady state null errors for providing a third signal representative of airplane ground track rate in combination with said sensor steady state null errors;
   fourth means comprising a further adder circuit connected to said third means for providing signals representative of dynamic ground track rate at the output of said further adder circuit means and having integrator circuit means coupled in feedback circuit around said further adder circuit, and further including switching means connected in series circuit between said integrator circuit means and said further adder circuit means, and operative to provide an open circuit during aircraft lateral manuevers thereby causing said integrator circuit means to store a signal representative of said steady state null errors; and
   utilization means comprising control surface actuator means responsive to said signal representative of airplane dynamic ground track rate coupled between said further adder circuit means and the control surface means of said aircraft.

3. In combination in a roll axis control system for an aircraft:
   first means for generating a first signal representative of deviation from aircraft flight path;
   second means for producing a second signal referenced to the aircraft ground track rate;
   third means comprising lag filter circuit means coupled to said second means for producing a third signal representative of change in aircraft ground track;
   fourth means for combining said first signal and said third signal to null or cancel said first signal; and
   fifth means including lateral control actuator means coupled between said fourth means and the control surfaces of said aircraft.

4. The invention according to claim 3 wherein said second means comprises:
   an accelerometer arranged in said aircraft and having the sensing axis thereof disposed parallel to the lateral axis of said aircraft;
   a roll attitude signal source; and
   means for combining the outputs of said accelerometer and roll attitude signal source to provide said second signal.

5. A roll axis control system for providing a flight path command signal at the system output terminal comprising in combination:
   localizer error detector means;
   first lag filter circuit means;
   decreasing gain programmer circuit means;
   first adder circuit means;
   amplifier circuit means;
   said first lag filter circuit means, said decreasing gain programmer circuit means, said first adder circuit means and said amplifier circuit means connected in series circuit between said localizer error detector means and the system output terminal;

localizer integrator circuit means and first increasing gain programmer circuit means coupled in series circuit between said first adder circuit means and said output terminal;

means for generating a signal representative of aircraft dynamic ground track rate, second increasing gain programmer circuit means and second lag filter circuit means coupled in series circuit between said means for generating a signal representative of airplane dynamic ground track rate and said first adder circuit means;

surface feedback measuring means;

first means coupling said surface feedback means between the control surfaces and said system output terminal;

altitude above terrain detector means for providing said increasing and decreasing gain programmer circuit means;

roll attitude signal generating means;

said roll attitude signal generating means connected to said first adder means;

roll rate signal generating means; and third lag filter circuit means coupled in series circuit between said roll rate signal generating means and said first adder circuit means.

6. The invention according to claim 5 further comprising:

means for generating a signal representative of aircraft lateral acceleration;

adder circuit means for combining the signals from said means for generating a signal representative of aircraft lateral acceleration and said roll attitude signal generating means thereby generating a signal representative of aircraft ground track rate, further adder circuit means connected to the output of said adder circuit means to generate a signal representative of aircraft dynamic ground track rate, integrator circuit means connected in feedback circuit around said further adder circuit.

7. The invention according to claim 5 further comprising:

first switching means connected in series-circuit between said localizer integrator circuit means and said amplifier output terminal and operative to provide an open circuit upon control actuation and simultaneously provide a closed circuit between said localizer integrator circuit means and said first lag filter circuit means output thereby storing a constant signal at said integrator circuit means output representative of initial localizer error and actual airplane ground track upon control actuation, the said constant signal further representative of a ground track command to cause the aircraft to manuever so as to exponentially acquire localizer beam center; and, second switching means connected in series circuit between said means for generating a signal representative of aircraft dynamic ground track rate and said second increasing gain programmer circuit means, and operative simultaneously with said first switching means.

8. The invention according to claim 5 further comprising switching means coupled in series circuit between said localizer error detector means and said first lag filter circuit means and operative during automatic go-around to provide an open circuit thereby decoupling said localizer error detector means and providing automatic go-around control referenced to aircraft ground track.

9. The invention according to claim 5 further comprising means in said first lag filter circuit means for providing a limited maximum roll command for coupling with said decreasing gain programmer circuit means to automatically decrease said maximum roll command limit for flare manuever.

10. A roll axis control system for providing a flight path command signal at the system output terminal comprising in combination:

means for generating a signal representative of aircraft dynamic ground track rate;

first lag filter circuit means;

adder circuit means;

amplifier circuit means;

said first lag filter circuit means and adder circuit means coupled in series circuit between said means for generating a signal representative of aircraft dynamic ground track rate and said amplifier circuit means, said amplifier circuit means connected to the control system output terminal;

means for storing a constant signal representative of actual aircraft ground track error upon initiation of automatic control coupled to said adder circuit means;

surface feedback measuring means;

first means coupling said surface feedback means between the control surfaces and said system output terminal;

roll attitude signal generating means connected to said adder circuit means;

roll rate signal generating means; and, second lag filter circuit means connected in series circuit between said roll rate signal generating means and said adder circuit means.

11. In combination in an aircraft having a roll axis control system:

first means for generating a programmed disturbance of the aircraft laterally away from the intended flight path for testing integrity of the system;

said first means comprising means including a voltage shaping circuit;

said first means actuated by logic control signals, said logic control signals responsive to roll axis control signals of said control system;

said means including a voltage shaping circuit providing a signal voltage coupled to said control system for disturbing the aircraft away from the flight path and subsequently reducing the amplitude of said signal voltage thereby providing control system commands for re-acquiring the localizer zero plane upon generation of input signals by all sensors and respective signal shaping paths of said sensors.

12. In combination in an aircraft having a roll axis control system and having an output terminal:

first means coupled to said output terminal for storing a constant signal representative of commanded ground track error;

second means coupled to said output terminal for generating a further signal representative of change in ground track thereby providing a signal to null or cancel said commanded ground track error signal for providing ground track referenced control during go-around;

said second means comprising:

an accelerometer disposed in the body of the aircraft having the sensing axis parallel to the aircraft lateral axis, a roll attitude sensor, adder circuit means for combining the respective signals of said accelerometer and said roll attitude sensor thereby generating a third signal representative of aircraft ground track rate, lag filter circuit means connected in series circuit with said adder circuit means for providing pseudo-integration of said third signal thereby generating said further signal, and first switching means connected in series circuit between said adder circuit means and said lag filter circuit means.

13. The invention according to claim 12 wherein said second means further comprises gain programming means connected in series circuit between said first switching means and said lag filter circuit means for providing variable damping during automatic go-around control.

* * * * *